Patented Sept. 8, 1936

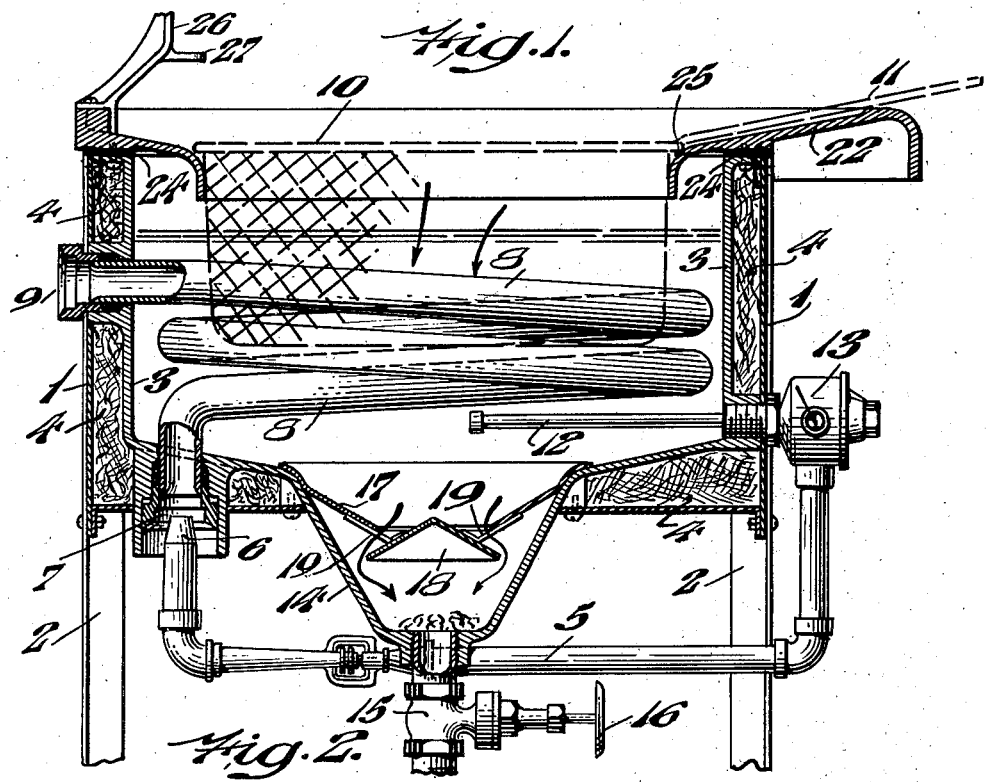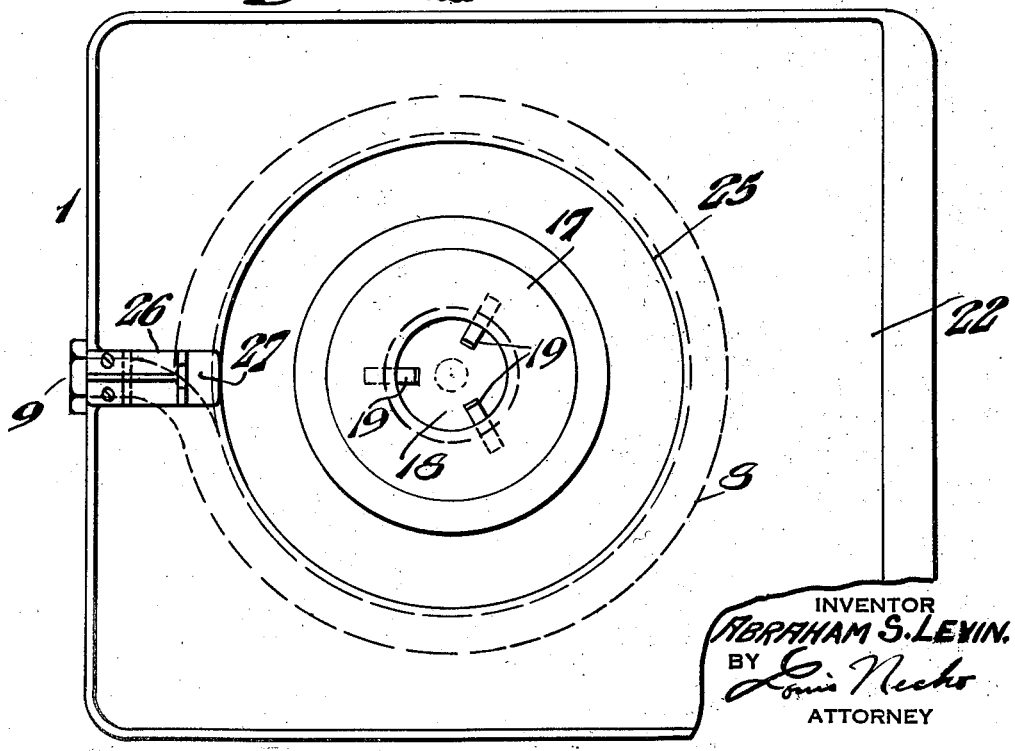

2,053,568

UNITED STATES PATENT OFFICE 2,053,568

DEEP FAT FRYER

Abraham S. Levin, Philadelphia, Pa.

Application December 2, 1935, Serial No. 52,489

2 Claims. (Cl. 53—7)

My invention relates to a new and useful deep fat fryer of the type ordinarily used in industrial kitchens such as restaurants, hotels, and the like, and it relates more particularly to a fryer in which the necessary heat is transmitted to the fat by direct contact or conduction, and one in which a sediment trap is formed which is practically completely isolated from the circulation of the fat thereby automatically removing the sediment from the fat and preventing its recirculation therewith.

My invention still further relates to a deep fat fryer of a generally improved design, and one in which the top, or working table, of the fryer is adequately insulated from the fryer proper to prevent injury to the operator of the fryer by excessive heating of the working table.

In the accompanying drawing:

Fig. 1 represents a vertical section of a fryer embodying my invention.

Fig. 2 represents a plan view of Fig. 1.

Referring to the drawing in which like reference characters indicate like parts, 1 designates an outer casing which is suitably supported on the legs 2 and which is separated from the inner pot 3 by suitable insulation 4. 5 designates a gas line which terminates in the burner 6 which is of the venturi type and which registers with and projects into the opening 7 of the coil 8 the other end of which projects through the wall of the fryer, as at 9, to exhaust the products of combustion. The coil 8 is disposed within the pot 3 and within the coil 8 is disposed the wire or screen basket 10 which is provided with any suitable handle 11. 12 designates a thermostat which operates the valve 13 to regulate the amount of gas delivered to the burner, this in accordance with the temperature of the fat in the pot 3. Below the pot 3, and removed from the source of heat, is the trap 14 which has the outlet 15 controlled by the valve 16. Over the trap 14 is disposed a pair of intersecting cones 17 and 18 which are secured, in spaced relation, by the brackets 19. To the top of the pot 3 is secured the working table 22 which is insulated from the pot by the gasket 24 to prevent or greatly reduce heat transmission from the pot 3 to the working table 22.

The operation is as follows: the basket 10, containing the material to be fried, is lowered into the pot 3 with the rim 25 thereof resting upon the edge of the working table 22. The heat is transmitted from the coil 8 directly to the frying fat in which it is submerged and, as the oil is heated around the coil, it rises and surges towards the center which is relatively cooler and descends over the cone 18 so that the sediment in the oil will pass between the cone 18 and the cone 17 and rest at the bottom of the trap 14.

Due to the fact that the trap 14 is below the point of maximum heat, and due to the fact that the contents of the bottom of the trap 14 are completely shielded by the cones 17 and 18 from the circulation of the oil, it will be seen that the sediment entering the trap 14 is permanently retained in the trap and prevented from resurging upwardly with the oil so that the frying fat, or oil, is constantly filtered and maintained free of any sediment. When the material being fried is sufficiently cooked, the basket 10 is raised by the handle 11 and is supported on the upper end of the vertical arm 26 with the bottom of the basket resting on the lug 27, in which position the frying fat is allowed to drain into the pot 3 from the contents of the basket 10. By the provision of the insulating gasket 24 overheating of the working table 22 is prevented so that the danger of injury to the operator, whose hands may come in contact with the working table 22, is prevented. By positioning the coil 8 along the wall of the pot 3, or in a position surrounding the basket 10, greater uniformity of the contact of the heated fat with the contents of the basket is achieved, due to the fact that the upwardly surging heated oil around the coil is forced to move radially, inwardly towards the center of the basket, and to pass downwardly through the contents of the basket and outwardly radially again at the bottom of the basket to complete the cycle of circulation. The complete and permanent removal of the sediment, as it develops in the oil due to cooking of the contents of the basket, results in better cooking of the contents and improvement of the taste of the finished product.

Having thus described my invention, what I claim as new and desire to secure by Letters Patent is,

1. A fryer of the character described comprising a pot, a heating coil disposed along the inner wall of said pot, a sediment trap positioned below said coil and communicating with the bottom of said pot, and means intermediate said sediment trap and the bottom of said pot for permitting ingress of said sediment into said trap and for preventing egress of said sediment from said trap into said pot.

2. In a deep fat fryer the combination of a pot, a tubular coil positioned along the inner wall of said pot, normally submerged in the frying grease, and adapted to receive hot combusted gases, the inlet end of said coil projecting through the bottom of said pot and the outlet end of said coil passing through a vertical wall of said pot for exhausting said combusted gases, and a basket adapted to contain the material to be fried and adapted to be positioned within said coil.

ABRAHAM S. LEVIN.